(12) United States Patent
Hinman et al.

(10) Patent No.: US 8,259,929 B2
(45) Date of Patent: Sep. 4, 2012

(54) METHODS AND APPARATUSES TO PROVIDE A BACK UP POWER SUPPLY FOR A NETWORK INTERFACE DEVICE

(75) Inventors: Brian Hinman, Los Gatos, CA (US); James T. Schley-May, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 985 days.

(21) Appl. No.: 11/592,814

(22) Filed: Nov. 2, 2006

(65) Prior Publication Data

US 2007/0127712 A1 Jun. 7, 2007

Related U.S. Application Data

(60) Provisional application No. 60/734,008, filed on Nov. 4, 2005.

(51) Int. Cl.
H04M 9/00 (2006.01)
(52) U.S. Cl. .................................. 379/413; 379/395.01
(58) Field of Classification Search ................... 379/413, 379/413.02
See application file for complete search history.

(56) References Cited

U.S. PATENT DOCUMENTS

| 5,444,759 | A | 8/1995 | Vogt, III et al. | |
| 5,774,316 | A | 6/1998 | McGary et al. | |
| 6,556,562 | B1 * | 4/2003 | Bhagavath et al. | 370/352 |
| 6,658,108 | B1 * | 12/2003 | Bissell et al. | 379/413 |
| 7,184,428 | B1 * | 2/2007 | Gerszberg et al. | 370/352 |
| 7,242,764 | B2 | 7/2007 | Miyamoto | |
| 7,262,695 | B2 | 8/2007 | Hicks, III | |
| 7,672,448 | B2 | 3/2010 | Schley-May et al. | |
| 2002/0003873 | A1 * | 1/2002 | Rabenko et al. | 379/413 |
| 2003/0202655 | A1 * | 10/2003 | Nattkemper et al. | 379/413 |
| 2004/0054484 | A1 * | 3/2004 | Farabaugh et al. | 702/63 |
| 2004/0183379 | A1 | 9/2004 | Sinha | |
| 2004/0213404 | A1 | 10/2004 | Posthuma | |
| 2004/0264687 | A1 * | 12/2004 | Casey et al. | 379/413.02 |
| 2005/0008131 | A1 * | 1/2005 | Cook | 379/93.05 |

OTHER PUBLICATIONS

PCT Search Report, International Application No. PCT/US06/43060, International Filing Date Nov. 3, 2006, Mailed Oct. 17, 2007.
PCT Written Opinion of the International Searching Authority, International Application No. PCT/US06/43060, International Filing Date Nov. 3, 2006, Mailed Oct. 17, 2007.
PCT Search Report, International Application No. PCT/US06/43110, International Filing Date Nov. 3, 2006, Mailed Aug. 28, 2007.

(Continued)

*Primary Examiner* — Walter F Briney, III
(74) *Attorney, Agent, or Firm* — Head, Johnson & Kachigian, P.C.

(57) ABSTRACT

Various methods, apparatuses, and systems in which a back up power supply is provided to a network interface device are described. In one embodiment, an apparatus includes a network interface device (NID) located outside a building and a power supply unit located inside the building. The power supply unit has one or more ports that couple via a phone line to the NID to provide a power signal to the NID. The apparatus further includes a direct current (DC) back up power unit located in the NID. The DC back up power unit provides back up power to the NID. The NID is configured to periodically switch between receiving the power signal from the power supply unit and the DC back up power unit even when no fault condition exists in the power supply unit.

19 Claims, 5 Drawing Sheets

OTHER PUBLICATIONS

PCT Written Opinion of the International Searching Authority, International Application No. PCT/US06/43110, International Filing Date Nov. 3, 2006, Mailed Aug. 28, 2007.

PCT International Preliminary Report on Patentability, PCT/US2006/043110 filed Nov. 3, 2006, mailed May 15, 2008.

Office Action dated Dec. 10, 2010 for U.S. Appl. No. 11/592,815, 12 pages.

PCT International Preliminary Report on Patentability, PCT/US2006/043060 filed Nov. 3, 2006, mailed May 15, 2008.

* cited by examiner

METHODS AND APPARATUSES TO PROVIDE A BACK UP POWER SUPPLY FOR A NETWORK INTERFACE DEVICE

RELATED APPLICATIONS

This application claims the benefit of U.S. provisional application No. 60/734,008, filed on Nov. 4, 2005.

TECHNICAL FIELD OF THE INVENTION

Embodiments of the invention generally relate to telecommunication systems used to provide broadband access. More particularly, an aspect of an embodiment of the invention relates to supplying back up power for network interface devices.

BACKGROUND

Typically, telecommunication systems that provide broadband access to customers contain a communication, digital subscriber line (DSL), or residential gateway which consists of an xDSL (any type of digital subscriber line) modem or xPON (any type of passive optical network) interface combined with various local area networking (LAN) technologies to enable sharing the broadband access with other computers or devices within the building or residence. Wireless local area network standards and home phone line networking (HPNA) are examples of LAN technologies. In addition, some telecommunication systems may provide a voice-over-internet-protocol (VOIP) feature to allow telephone calls via the broadband link. Some systems may, in addition to broadband access sharing, need to distribute broadband media content such as video streams into various locations within the residence.

Typically the residential gateway is located inside the house. However, it is desirable to locate the residential gateway at the Network Interface Device (NID) outside the house. A NID is the point of demarcation between the Unbundled Network Element (UNE) loop and the end user's inside wire. Reasons for desirability of locating the residential gateway at the NID include the ability to provide simplified installation wiring and to eliminate the need to have the user home when the bulk of installation occurs. Further, as fiber to the neighborhood rolls out, integration will be easier if the active electronics are already present at the NID. Also, installation practices can be merged between xPON and xDSL systems such that the primary network termination is the merely difference.

However, a significant problem in trying to locate the residential gateway at the NID is the problem of providing power. There is often no source of Alternating Current (AC) power accessible at the NID location. Consequently, powering from inside the house is one viable option. The use of existing phone wiring would be the most desirable way, since the cost of installing new wiring is prohibitive.

However, the existing phone wiring if used for powering the NID must not damage phones devices connected to the phone wiring. Also, if a telecommunication system offers phone service via a broadband link, then the system must have a back up power unit to ensure the availability of lifeline functionality such as 911 calling in the event of a power outage. Furthermore, the existing phone wire must be reserved for voice band telephony including its requisite Direct Current (DC) signaling. This constraint appears to preclude its use for supplying power to the NID.

SUMMARY

Various methods, apparatuses, and systems in which a back up power supply is provided to a network interface device are described. In one embodiment, an apparatus includes a network interface device (NID) located outside a building and a power supply unit located inside the building. The power supply unit has one or more ports that couple via a phone line to the NID to provide a power signal to the NID. The apparatus further includes a direct current (DC) back up power unit located in the NID. The DC back up power unit provides back up power to the NID. The NID is configured to periodically switch between receiving the power signal from the power supply unit and the DC back up power unit even when no fault condition exists in the power supply unit.

BRIEF DESCRIPTION OF THE DRAWINGS

One or more embodiments are illustrated by way of example and not limitation in the figures of the accompanying drawings, in which like references indicate similar elements and in which.

DETAILED DISCUSSION

In the following description, numerous specific details are set forth, such as examples of specific signals, named components, connections, example voltages, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. The specific details set forth are merely exemplary. The specific details may be varied from and still be contemplated to be within the spirit and scope of the present invention. The term coupled is defined as meaning connected either directly to the component or indirectly to the component through another component.

In general, various methods, apparatuses, and systems in which fault monitoring is provided to a network interface device are described. In one embodiment, an apparatus includes a network interface device (NID) located outside a building and a power supply unit located inside the building. The power supply unit has one or more ports that couple via a phone line to the NID to provide a power signal to the NID. The apparatus further includes a direct current (DC) back up power unit located in the NID. The DC back up power unit provides back up power to the NID. The NID is configured to periodically switch between receiving the power signal from the power supply unit and the DC back up power unit even when no fault condition exists in the power supply unit. The location of the DC back up power unit in the NID minimizes the size of the DC back up power unit based on minimizing a transmission loss of the power supplied to the NID from the DC back up power unit compared to a second DC back up power unit located outside the NID.

Figure 1:
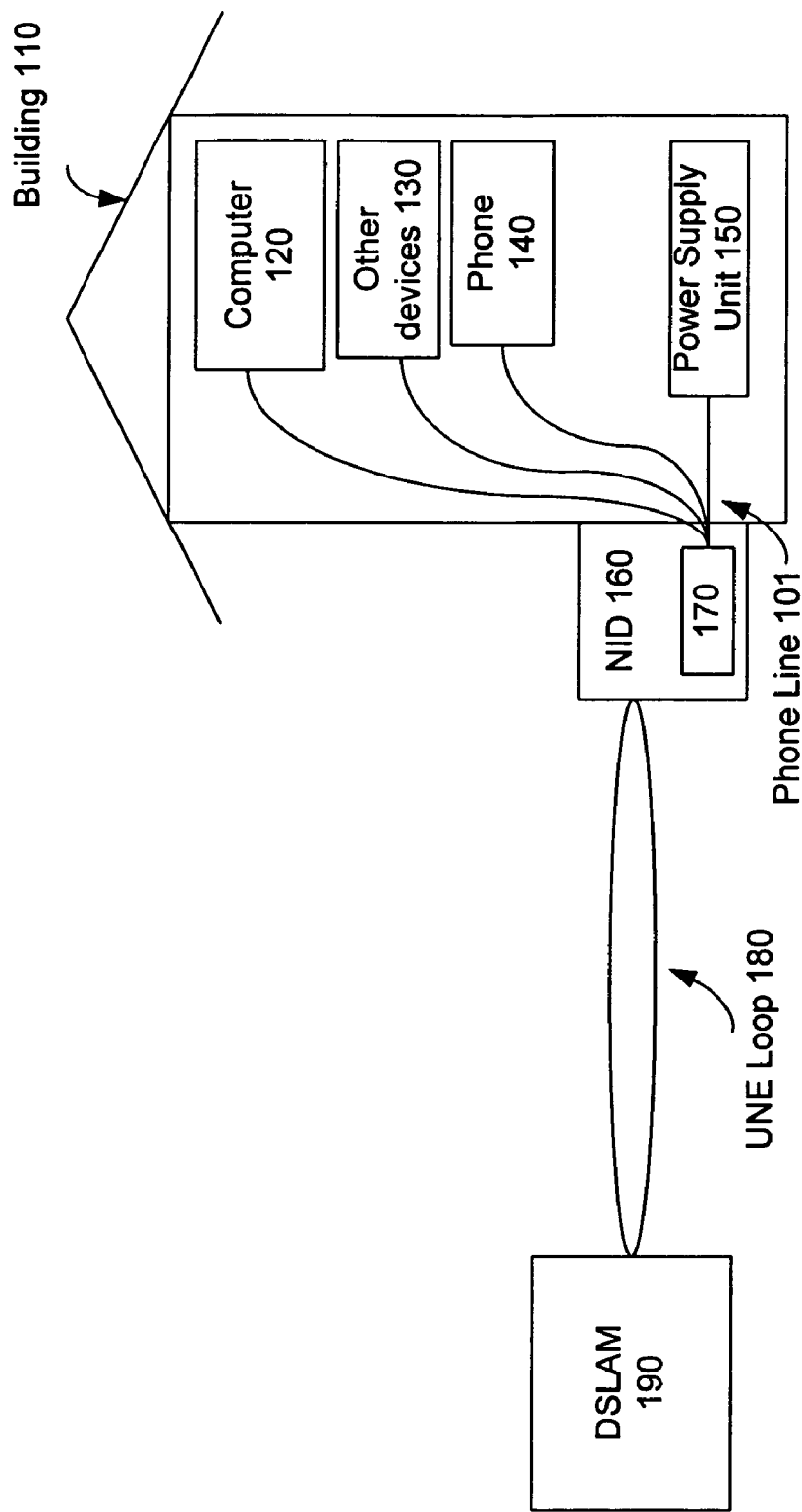
FIG. 1 illustrates a block diagram of an embodiment of a central office containing a Digital Subscriber Loop Access Multiplexer sending communications across an Unbundled Network Element (UNE) loop to a network interface device (NID)

FIG. 1 illustrates a block diagram of an embodiment of a central office containing a Digital Subscriber Loop Access Multiplexer sending communications across an Unbundled Network Element (UNE) loop to a network interface device (NID). Power is provided to a digital subscriber line (DSL) gateway 170 located at the NID 160 via an existing phone line 101 by a Power Supply Unit (PSU) 150 located inside the building 110. The NID 160 is the point of demarcation between the UNE loop 180 and the end user's phone line 101. Thus, a single existing phone line 101 is used to supply demands of the DSL gateway 170 located at the NID 160. This is accomplished, in part, by placing active electronics in the NID 160, and by having the internal power supply feeding the single phone line 101.

As shown in FIG. 1, one or more telephones 140 may couple to line 101. Other devices 130, such as fax machines, answering machines, and analog modems, may also couple to line 101. A computer 120 may also couple to line 101. Optional HPNA devices may also couple to line 101, such as via a filter (not shown). A HPNA device may be connected to a media device, such as a set-top box.

Figure 2:
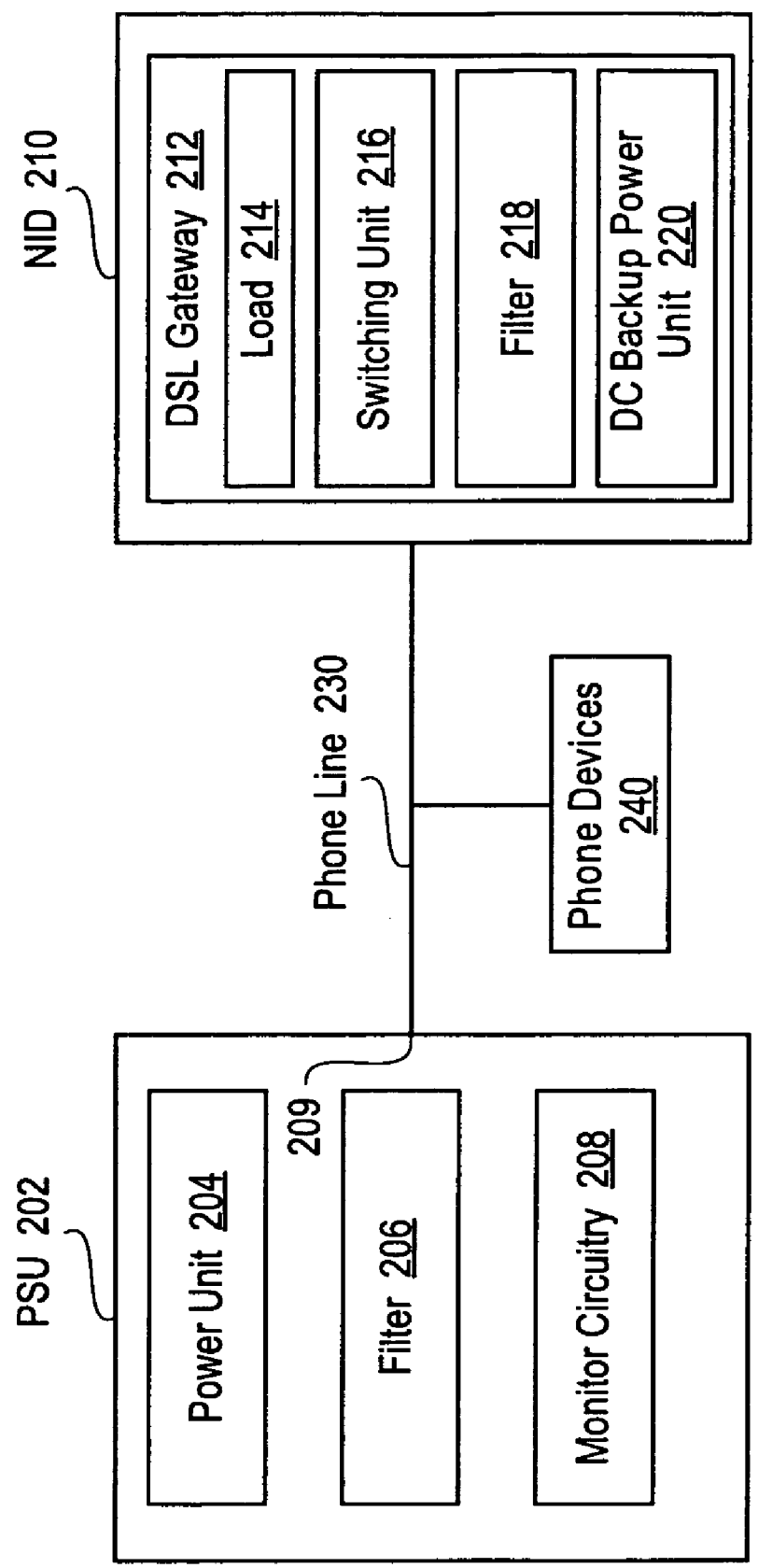
FIG. 2 illustrates a block diagram of an embodiment of a power supply unit located inside a building providing power to a NID located outside the building.

FIG. 2 illustrates a block diagram of an embodiment of a power supply unit (PSU) located inside a building providing power to a network interface device (NID) located outside the building. An apparatus 200 includes the NID 210 coupled to the PSU 202 via a phone line 230. The NID 210 includes a digital subscriber line (DSL) gateway 212. In addition to broadband media content, the DSL gateway 212 provides the internet protocol (IP) connection necessary for voice-over-IP (VOIP).

The PSU 202 located inside the building has one or more ports 209 that couple via the phone line 230 to the NID 210 to provide a power signal to the NID 210. The PSU 202 includes a power unit 204, a filter 206, and a monitor circuitry 208. The PSU 202 may plug into 120 Volts (V) AC and generates a power signal at a particular frequency which is injected onto the phone line 230. The frequency selected can be, for example, 25 kilo-hertz (KHz). At 25 KHz, the power signal does not interfere with voice service, since this is far above the voice band and inaudible.

The power signal may be injected onto the phone line 230 via a series resonant LC filter 206 having a sharp quality factor (Q). The filter 206 is sized such that the impedance and losses of the filter 206 is minimized at 25 KHz but high at frequencies above and below 25 KHz. The filter 206 effectively isolates the 25 KHz from the voice band which is 0 to 4 KHz and from the home phone line networking (HPNA) band which is 4 mega-hertz (MHz) and higher as well as the DSL band. The power can be received at the DSL gateway 212 through a similar filter 218 for the same reason. In between the PSU 202 and NID 210, various voice band phone devices 240 are typically connected. A filter generally is required in front of each telephony device to protect and isolate it from the power signal.

The 25 KHz signal is far above the voice band, but the signal can potentially damage telephones that are unprotected by the required filter. Typically, the installation of a multi-order low pass filter to protect the telephone is the responsibility of the homeowner or end user. Some end users may forget or neglect to install a filter in front of each telephone device. In this case, the telephone device may potentially be damaged by the 25 KHz power signal.

The monitor circuitry 208 monitors the power signal received by the NID 210 via the phone line 230. The monitor circuitry 208 checks for a fault condition of phone devices 240 that are coupled to the phone line 230. The fault condition is detected when the power signal changes by a predetermined amount, which can indicate the absence of a protective filter coupled to a phone device 240. The predetermined amount may be a change of the power signal being present to the power signal not being present. The monitor circuitry 208 includes a normal mode for typical NID 210 operations and a fault detection mode in order to check for the fault condition of at least one phone device 240 during the fault detection mode. The NID 210 continues to function normally during the fault detection mode, but the power source for the NID is no longer the PSU 202. Rather, the NID 210 receives power from a DC back up power unit 220 during the fault detection mode.

The DSL gateway 212 supports DSL communications and includes a switching unit 216 that is configured to couple a load 214 to a filter 218 during the normal mode of the monitor circuitry 208. The filter 218 is configured to limit a bandwidth of the power signal sent to the NID 210. The switching unit 216 is configured to decouple the load 214 from the filter 218 during the fault detection mode of the monitor circuitry 208. The load 214 is configured to receive power from the DC back up power unit 220 during the fault detection mode. The load 214 includes one or more components located in the NID 210 having a low impedance path. The switching of power supplies between the DC back up power unit 220 and the PSU 202 located inside the building occurs on a periodic basis even when no fault condition exists.

The apparatus 200 can implement a power interruption and monitoring scheme. In certain embodiments, at regular intervals, perhaps once every second, the DSL gateway 212 stops drawing 25 KHz power from the PSU 202 for a short period of time. The time period can be, for instance, 10 milliseconds long. For example, the monitor circuitry 208 can be in normal mode ninety-nine percent of the time, and in fault detection mode one percent of the time. While in fault detection mode, the DSL gateway 212 relies on the DC back up power unit 220. During fault detection mode, since the load 214 is drawing no power from the PSU 202, the PSU 202 can monitor its outgoing power to determine if there is a fault condition such as a phone device 240 without the required protective filter. If the PSU 202 senses a predetermined amount of power being drawn during this fault detection mode, the PSU 202 can properly determine that there is a fault condition and communicate that to the DSL gateway 212 and/or to the user. The predetermined amount of power being drawn that indicates a fault condition may be one to ten milliwatts (mW) of power.

In certain embodiments, the communication is by way of light emitting diodes (LED) signaling on the PSU 202. In this way, the user can make corrections until the fault condition clears. Other duty cycles and timing intervals can be used to accomplish the same end result. Control of this function can be in either the PSU 202 or the DSL gateway 212 using a two-way communication link. Thus, the design of apparatus 200 may use circuitry associated with allowing the load 214 to disconnect periodically from the phone line 230.

The apparatus 200 provides automatic fault detection such that the user can self correct installation wiring problems without necessarily involving technical support personnel. The apparatus 200 also provides the ability to check for improper installation necessary to be able to use the 25 KHz powering scheme. Further, customer owned telephone equipment will not be harmed due to incorrect installation of filters.

Certain embodiments solve problems associated with locating the DC back up power unit 220 inside the house by locating the DC back up power unit 220 in the NID 210. This provides much more accessibility to telecommunications personnel for installation and routine testing and maintenance.

As previously discussed, the DC back up power unit 220 provides back up power to the NID 210, which is configured to periodically switch between receiving the power signal from the PSU 202 and the DC back up power unit 220 even when no fault condition exists in the PSU 202. The DC back up power unit 220 may include a battery source, fuel cell source, or other like power source.

Locating the DC back up power unit 220 within the NID 210 facilitates greater system efficiency and smaller size of the DC back up power unit 220 compared to locating the DC back up power unit 220 at a different location. The location of the DC back up power unit 220 in the NID 210 minimizes a physical dimensions of the DC back up power unit 220 based on minimizing an energy conversion loss of the DC back up power unit 220 compared to a second DC back up power unit (not shown) located outside the NID 210. A single energy conversion is required for the DC back up power unit 220 located in the NID 210 while an additional energy conversion may be needed for the second DC back up power unit located outside the NID 210 such as in the PSU 202.

The location of the DC back up power unit 220 in the NID 210 further minimizes the size of the DC back up power unit 220 based on minimizing a transmission loss of the power supplied to the NID 210 from the DC back up power unit 220 compared to a second DC back up power unit (not shown) located outside the NID 210. For example, the second DC back up power unit located in the PSU 202 experiences a transmission loss in proportion to the distance from the PSU 202 to the NID 210. The location of the DC back up power unit 220 in the NID 210 also provides outdoor access to the DC back up power unit 220 in order to have trained technical support personnel install and maintain the DC back up power unit 220 without having access to the building.

In certain embodiments, the apparatus 200 includes a DC back up power unit 220 located in the NID 210. The phone line 230 may include a first phone line having a first ring/tip pair that couples a 25 KHz power signal between the PSU 202 and the NID 210. In another embodiment, the phone line 230 may include a second and a third phone line. The second phone line includes one wire from a second ring/tip pair and the third phone line includes one wire from a third ring/tip pair that couples a power signal between the PSU 210 and the NID 210. The power signal may be a ground isolated DC power signal.

Figure 3:
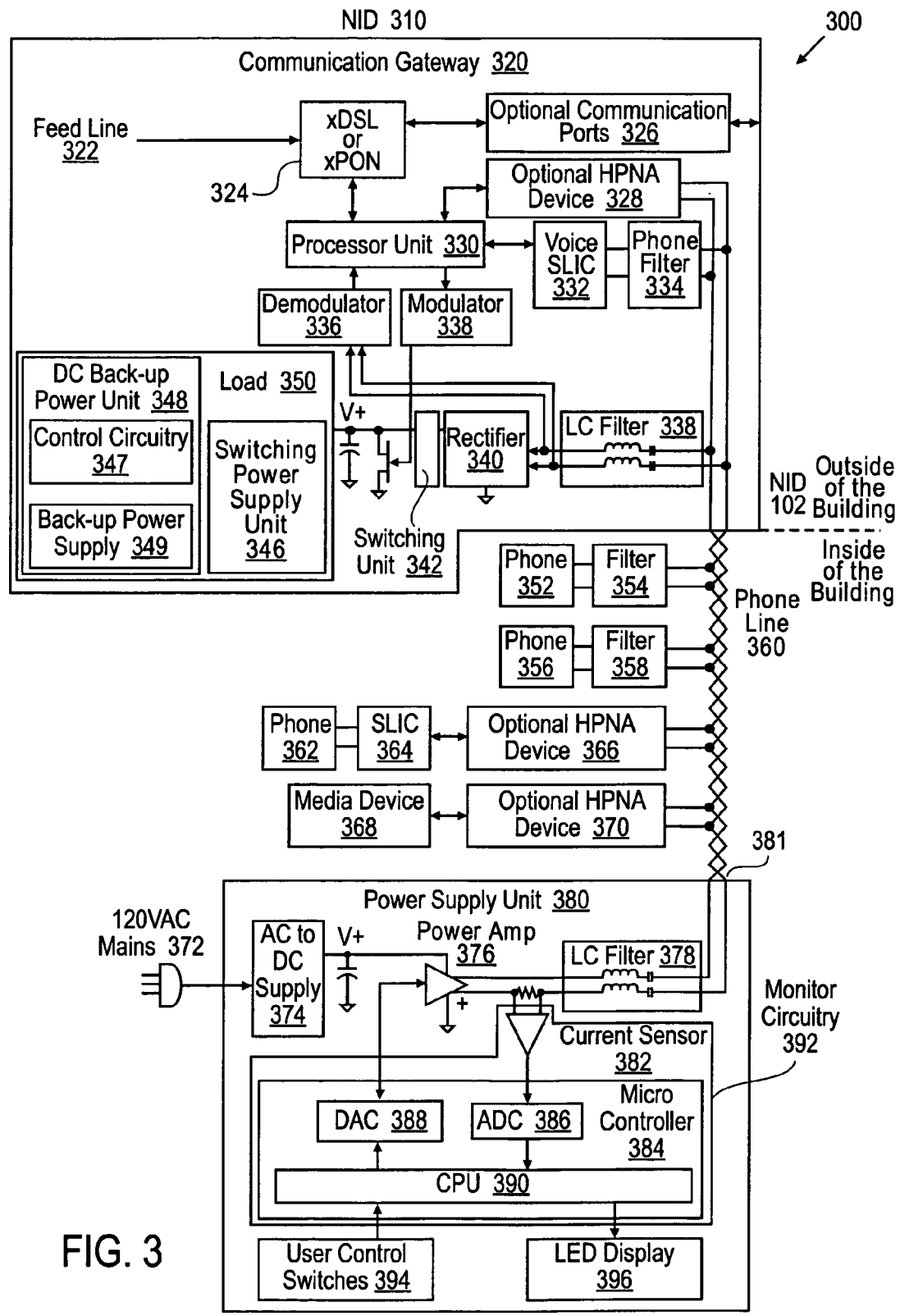
FIG. 3 illustrates a detailed block diagram of an embodiment of a power supply unit located inside a building providing power to a NID located outside the building.

FIG. 3 illustrates a detailed block diagram of an embodiment of a power supply unit located inside a building providing power to a NID located outside the building. A system 300 includes the NID 310 coupled to the PSU 380 via a phone line 360. The NID 310 includes a communication gateway (CG) 320 with a subscriber line interface circuit (SLIC) 332 coupled to the phone line 360. The PSU 380 has one or more ports 381 that couple via the phone line 360 to the CG 320 to provide a power signal to the CG 380.

The PSU 380 includes a monitor circuitry 392 that monitors the power signal received by the NID 310 via the phone line 360. The monitor circuitry 392 monitors a fault condition of at least one phone device (e.g., phones 352, 356, and 362) when the power signal changes by a predetermined amount. The monitor circuitry 392 has a normal mode and a fault detection mode to detect the occurrence of the fault condition of at least one phone device during the fault detection mode.

The CG 320 includes a switching unit 342 configured to couple a load 350 to a rectifier 340 that is coupled to a series resonant filter 338 during the normal mode. The series resonant filter 338 is configured to limit the bandwidth of the power signal received from the PSU 380. The switching unit 342 is configured to decouple the load 350 from the series resonant filter 338 during the fault detection mode of the monitor circuitry 392. The load 350 is configured to receive power from a direct current (DC) back up power unit 348 during the fault detection mode. The load 350 includes one or more components located in the NID 310 having a low impedance path such as a switching power supply unit 346 and the DC back up power unit 348. The load 350 receives power from the DC back up power unit 348 on a periodic basis even when no fault condition exists. The CG 320 includes a processor unit 330 to control normal CG 320 operations in addition to controlling the switching unit 342. The PSU 380 includes status indicators such as a light emitting diode (LED) display 396 to indicate the occurrence of the fault condition in order to protect the phone devices from being damaged by the power signal.

While in fault detection mode, the CG 320 receives power from the DC back up power unit 348. During fault detection mode, since the CG 320 is drawing no power from the PSU 380, the PSU 380 can monitor its outgoing power to determine if there is a fault condition such as a phone device without the required protective filter. If the PSU 380 senses a predetermined amount of power being drawn during this fault detection mode, then the PSU 380 may determine that there is a fault condition and communicate that to the NID 310, the user, and the service/maintenance provider. The predetermined amount of power being drawn that indicates a fault condition may be one to ten milliwatts (mW) of power.

In certain embodiments, the communication is by way of light emitting diodes (LED) signaling on the PSU 380. In this way, the user can make corrections until the fault condition clears. Other duty cycles and timing intervals can be used to accomplish the same end result. Control of this function can be in either the PSU 380 or the CG 320 using a two-way communication link.

The CG 320 provides the termination point for a feed line 322, which may be xDSL feed line or fiber feed line if xPON. In addition to broadband media content, the CG 200 provides the internet protocol connection necessary for voice-over-internet-protocol (VOIP). Voice data is encoded and decoded by the processor 330 and sent through the subscriber line interface circuit (SLIC) 332. The SLIC 332 provides functionality similar to that of the central office of FIG. 1 to any phones connected to the phone line 360. The SLIC 332 has a phone filter 334 in front of it to provide impedance isolation and filtering from phone line 360. According to one embodiment, the phone filter 334 is a multi-order bidirectional low pass filter that has a notch at a selected frequency for added attenuation. The phone filters 354 and 358 provide impedance isolation and filtering for phones 352 and 356, respectively. Optional HPNA device 366 may provide impedance isolation and filtering for phone 362 and SLIC 364. Optional HPNA device 370 may provide impedance isolation and filtering for media device 368.

The CG 320 may optionally have other communication ports 326, such as a coaxial cable or a wireless port. The CG 320 may optionally support HPNA networking to enable media content delivery to HPNA devices 328 such as set top boxes within the building.

Referring to FIG. 3, the PSU 380 may plug into 120 Volts (V) AC power supply 372 and generates a power signal at a particular frequency which is injected onto the phone line 360. The frequency selected can be, for example, 25 KHz. At 25 KHz, the power signal does not interfere with voice service, since this is far above the voice band and inaudible.

The power signal may be injected onto the phone line 360 via a series resonant LC filter 378 having a sharp quality factor (Q). The LC filter 378 is sized such that the impedance and losses of the LC filter 378 is minimized at 25 KHz but high at frequencies above and below 25 KHz. The LC filter 378 effectively isolates the 25 KHz from the voice band which is 0 to 4 KHz and from the HPNA band which is 4 mega-hertz (MHz) and higher as well as the DSL band.

The 25 KHz power signal can be as high 30 Volts Root Mean Square (Vrms) and still meet the National Electric Code's requirements for class two power. The voltage should be kept as high as possible to minimize the power loss through the phone line 360 to the CG 320. Generation of the 25 KHz power signal may be accomplished by using a digital to analog converter (DAC) 388 connected to a power amplifier 376. The power amplifier 376 may be a class D amplifier. The power amplifier 376 could also be linear. The power supply for the power amplifier 376 is received from an AC to DC supply converter 374 that receives AC voltage from the 120 VAC power supply 372.

In the CG 320, the 25 KHz signal is extracted from a series resonant LC filter 338. The signal is rectified using rectifier 340. The rectifier 340 may be implemented using diodes. Alternatively, the rectifier 340 may be implemented using transistors in a synchronous rectifier configuration. The switching unit 342 may be located external to the rectifier 340 as illustrated in FIG. 3. Alternatively, the switching unit 342 may be located internal to the rectifier 340. The filtered signal V+ is then used to feed the multitude of switching power supply regulator circuits located in the switching power supply unit 346 in the CG 320. The switching power supply unit 346 provides various power supplies to NID components.

Telephones that share the phone line 360 are impedance isolated from the 25 KHz power signal so as not to be adversely affected and also so as to not load the power signal. In certain embodiments, telephones that share the phone line 360 are impedance isolated from the 25 KHz power signal by having phone filters between each telephone and the phone line 360. The phone filters may be multi-order bidirectional low pass filters that have a notch at 25 KHz for added attenuation.

In the PSU 380, the monitor circuitry 392 includes a current sensor 382 and a microcontroller 384 having a digital to analog converter (DAC) 388, an analog to digital converter (ADC) 386, and a central processing unit (CPU) 390. The microcontroller 384 may include a modulator, a demodulator, a quadrature phase comparator and a voltage controlled oscillator. In certain embodiments, these functions are now done in the digital domain with microcode. The analog interfaces will occur through analog to digital (ADC) 386 and digital to analog (DAC) 388 converters. The ADC 386 monitors current and the DAC 384 generates the modulated 25 KHz sinusoid. The microcontroller 384 uses the current sensor 382 to measure whether there is any load current being drawn by improperly installed devices elsewhere on the system 300.

The LED display 396 is an example of indicators that may be implemented on the PSU 380 to reflect the state of the CG 320, PSU 380, or both. The PSU 380 may have indicator lights that reflect state as relayed by the CG 320. Other indicators may also be used. In certain embodiments, the LEDs may be refreshed at a rate of 2 Hz with 8 bits.

According to certain embodiments, upstream communication from the PSU 380 to the CG 320 is enabled by modulating the 25 KHz power signal using a modulation function internal to the microcontroller 384. Accordingly, the current draw of the CG 320 can be modulated by modulating feedback control pin(s) of the switching power supply unit 346 with some low frequency data in the hundreds of hertz. Frequency modulation can be used but other types of modulation (e.g., amplitude modulation (AM), phase modulation (PM), phase shift keying (PSK)) could also be used. A control signal can be encoded from upstream data derived from the user switches 394. In the CG 320, the 25 KHz signal can be monitored for frequency (or phase in the case of PM or magnitude in the case of AM) and demodulated using demodulator 336 to retrieve the data.

In the downstream direction, the concept of load modulation is employed. A transistor 341 represents a shunt load that is in parallel with the switching power supply unit 346. The transistor 341 is biased to a small percentage of the load 350, and then modulated about that center point by an amplitude modulator 337, causing the 25 KHz current consumption to modulate. At the PSU 380, current consumption is monitored using current sensor 382 to provide a signal that can be demodulated by microcontroller 384. After demodulation it is decoded using decode logic to drive the LED display 396. In certain embodiments, the signal is decoded with an error check to prevent a power interruption of the PSU 380 from causing a false reset.

In both directions, the modulation and demodulation functions can be implemented with low cost frequency shift key (FSK) modem chips, dual-tone-multi-frequency (DTMF, also known as touch-tone) encoder/decoders, or other circuits. The PSU 380 may have a reset button that can be used to reset the NID 310 remotely.

Certain embodiments solve problems associated with locating the DC back up power unit 348 inside a building by locating the DC back up power unit 348 in the NID 310. This provides much more accessibility to telecommunications personnel for installation and routine testing and maintenance.

The CG 320 further includes the DC back up power unit 348, which includes a control circuitry 347 and back up power supply 349. The control circuitry 347 monitors the state of the battery, allowing fast and slow charging, as well as discharge cycling. In certain embodiments, this is all controlled from the processor unit 330 by monitoring at least one of voltage, current, and temperature of the DC back up power unit 348. The DC back up power unit 348 provides back up power to the NID 310, which is configured to periodically switch between receiving the power signal from the PSU 380 and the DC back up power unit 348 even when no fault condition exists in the PSU 380.

The processor unit 330 may control the periodic switching between the power signal received from the PSU 380 and the DC back up power unit 348. Alternatively, the CG 320 may have a controller to control the periodic switching between the power signal received from the PSU 380 and the DC back up power unit 348.

In certain embodiments, the DC back up power unit 348 includes lead acid battery packs. In certain embodiments, to circumvent space constraints, a higher density battery technology would be desirable. Lithium Ion, with an energy density greater than 4 times that of lead acid, or Nickel Metal Hydride at 2 times the density of lead acid, are two alternate battery technologies that may be employed. Because the battery pack is accessible to telecommunications personnel, the battery pack can be sized according to specific needs. The battery pack can be field configurable such that, for example, one or two packs are employed to provide varying durations of backup support based on specific needs that may change over time.

Lithium Ion and Nickel Metal Hydride battery technology require the use of smart charging. Smart charging means that the voltage, current, and possibly temperature can be monitored while charging to adapt the charge characteristics to the battery state. The processor unit 330 may control the smart charging. This is necessary to avoid damage to the cells, as well as to optimize the time and efficiency of the charging cycle. In addition, periodic discharge and recharge is required in DC back up power unit 348 that may see normal discharge duty merely on an occasional, sporadic basis. Having the DC back up power unit 348 located within the CG 320 in the NID 310 allows the DC back up power unit 348 to take advantage of the high capacity microprocessor located in the processor unit 330 that is already required and therefore present in the CG 320 for other functions. This avoids the need to burden the PSU 380 with added microprocessor capacity.

The location of the DC back up power unit 348 in the NID 310 minimizes the size of the DC back up power unit 348 based on minimizing a transmission loss of the power supplied to the NID 310 from the DC back up power unit 348 compared to a second DC back up power unit (not shown) located outside the NID 310. For example, the second DC back up power unit located in the PSU 380 experiences a transmission loss in proportion to the distance from the PSU 380 to the NID 310. The location of the DC back up power unit 348 in the NID 310 also provides outdoor access to the DC back up power unit 348 in order to have trained technical support personnel install and maintain the DC back up power unit 348 without having access to the building.

The system 300 may include a DC back up power unit 348 located in the NID 310. The phone line 360 may include a first phone line having a first ring/tip pair that couples a 25 KHz power signal between the PSU 380 and the NID 310. Alternatively, the phone line 360 may include a second and a third phone line. The second phone line includes one wire from a second ring/tip pair and the third phone line includes one wire from a third ring/tip pair that couples a power signal between the PSU 380 and the NID 310. The power signal may be a ground isolated DC power signal.

Figure 4:
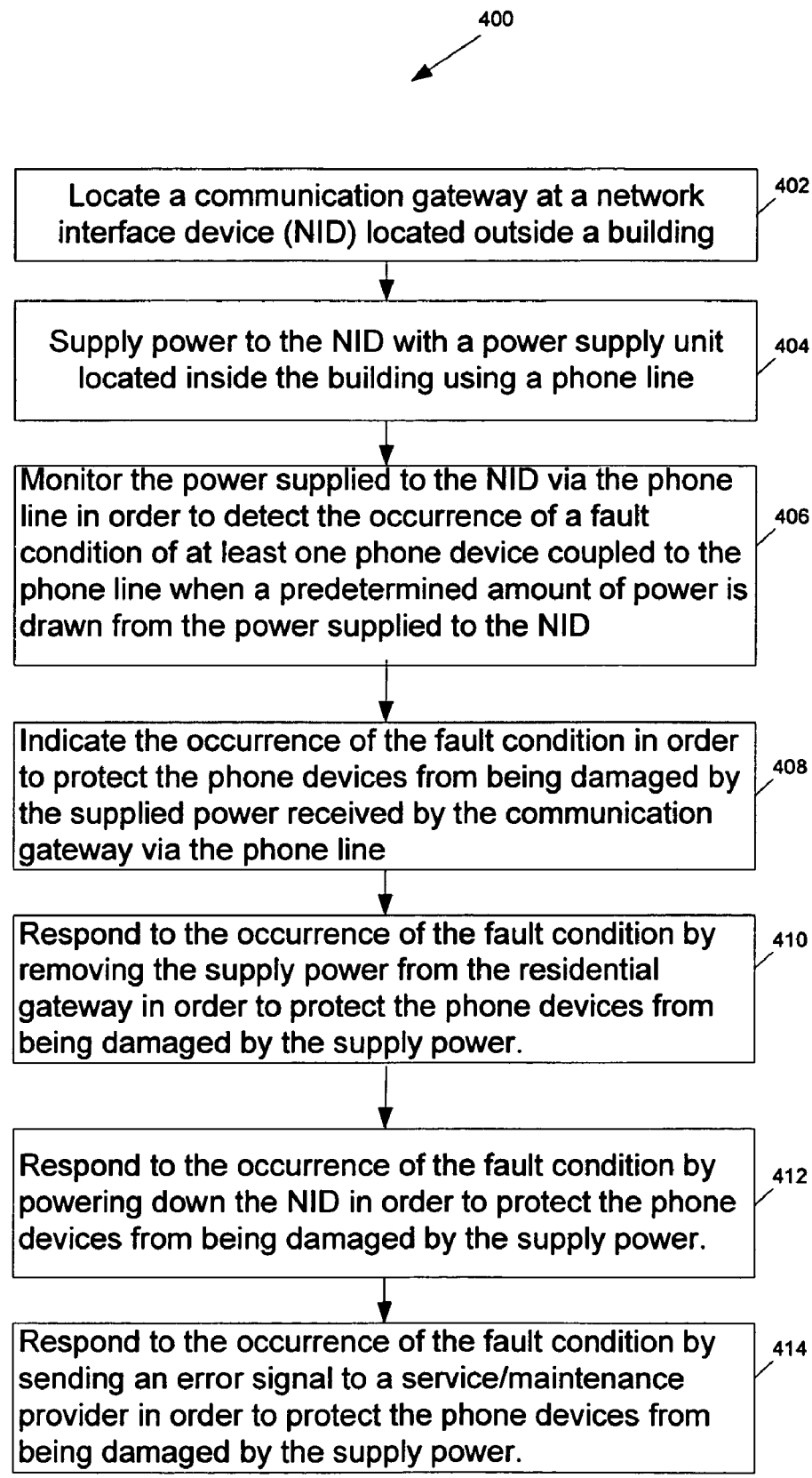
FIG. 4 illustrates a flowchart of an embodiment of a method of providing fault monitoring to a NID.

FIG. 4 illustrates a flowchart of an embodiment of a method of providing fault monitoring to a network interface device (NID). At block 402, the method 400 includes locating a communication gateway at the NID located outside a building. At block 404, the method 400 includes supplying power to the NID with a power supply unit located inside the building using a phone line. At block 406, the method 400 includes monitoring the power supplied to the NID via the phone line. A fault condition of at least one phone device coupled to the phone line is detected when a predetermined amount of power is drawn from the power supplied to the NID via the phone line. At block 408, the method 400 includes indicating the occurrence of the fault condition in order to protect the phone devices from being damaged by the supply power received by the communication gateway via the phone line. An alarm, light emitting diodes, or other device can be used to indicate the occurrence of the fault condition. At block 410, the method 400 includes responding to the occurrence of the fault condition by removing supply power from the NID via the phone line in order to protect the phone devices from being damaged by the supply power. At block 412, the method 400 includes responding to the occurrence of the fault condition by powering down the network interface device in order to protect the phone devices from being damaged by the supplied power. At block 414, the method 400 includes responding to the occurrence of the fault condition by sending an error signal to a service/maintenance provider such as the central office of the telephone service provider.

Figure 5:
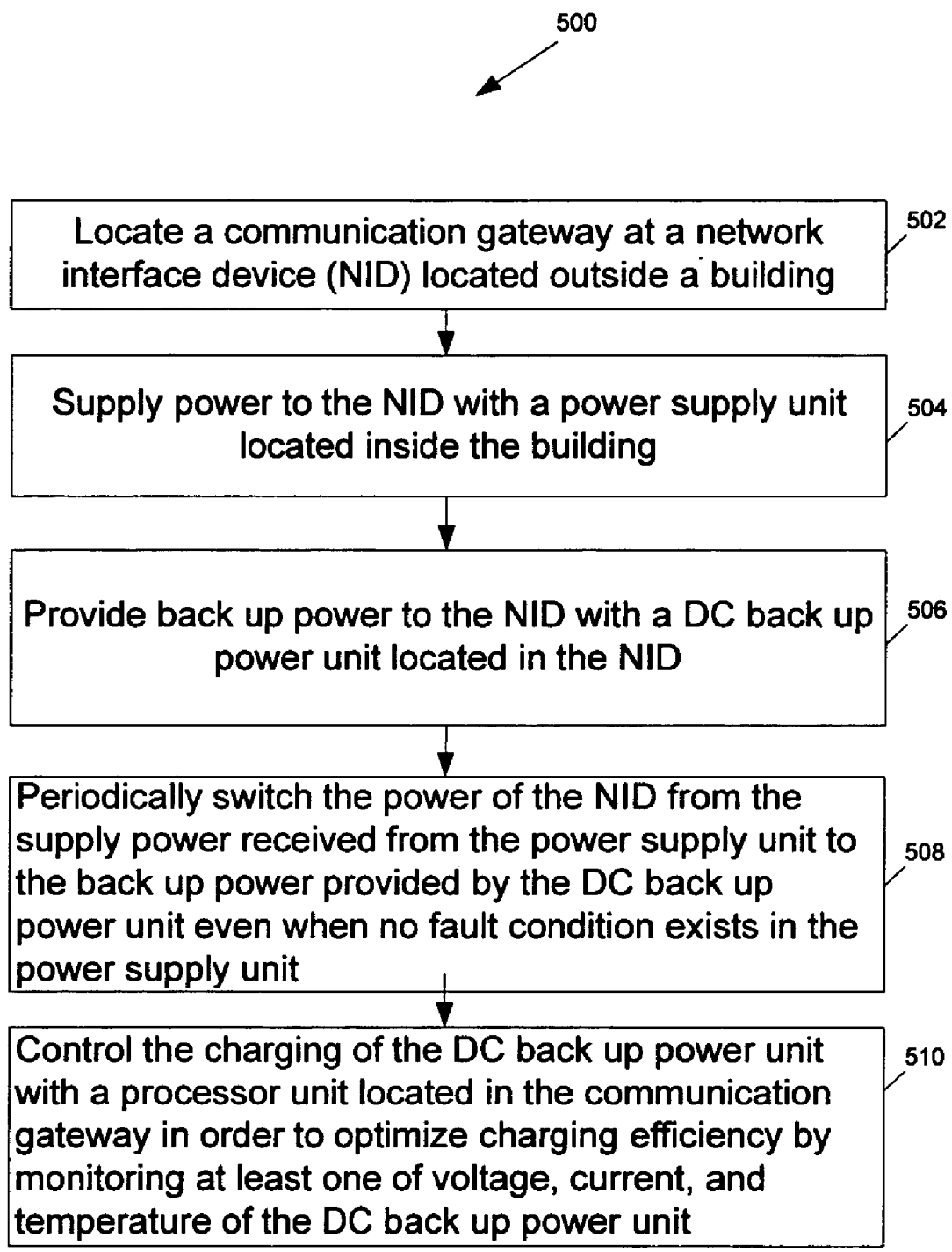
FIG. 5 illustrates a flowchart of an embodiment of a method of providing a back up power unit to a NID.

FIG. 5 illustrates a flowchart of an embodiment of a method of providing a back up power unit to a NID. At block 502, the method 500 includes locating a communication gateway at a network interface device (NID) located outside a building. At block 504, the method 500 includes supplying power to the NID with a power supply unit inside the building. At block 506, the method includes providing back up power to the NID with a DC back up power unit located in the NID. At block 508, the method 500 includes periodically switching the supply power of the NID from the supply power received from the power supply unit to the back up power provided by the DC back up power unit even when no fault condition exists in the power supply unit. At block 510, the method 500 includes controlling the charging of the DC back up power unit with a processor unit locating the communication gateway in order to optimize charging efficiency by monitoring at least one of voltage, current, and temperature of the DC back power unit.

Thus, according to embodiments of the present invention, systems, apparatuses and methods for providing a DC back up power unit to a NID are described. The systems, apparatuses and methods enable the powering of the NID located outside a building with a power supply unit located inside the building via a phone line that also provides voice and DSL service. The DC back up power unit provides back up power to the NID. The NID is configured to periodically switch between receiving a power signal from the power supply unit and the DC back up power unit even when no fault condition exists in the power supply unit. The configurations described herein solve several key deployment problems and enable a practical distribution system for broadband media content and voice services.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components. The hardware logic may consist of electronic circuits that follow the rules of Boolean Logic, software that contain patterns of instructions, or any combination of both. The invention is to be understood as not limited by the specific embodiments described herein, but merely by scope of the appended claims.

What is claimed is:

1. An apparatus comprising:
a network interface device (NID) located outside a building;
a power supply unit located inside the building, the power supply unit having one or more ports to provide a power signal to the NID; and
a direct current (DC) back up power unit located in the NID, the DC back up power unit to provide back up power to the NID, wherein the NB) is configured to periodically switch between receiving the power signal from the power supply unit and the DC back up power unit and when the power signal is received from the DC back up power unit, the apparatus enters a fault detection mode and, when in said mode, the power supply unit monitors its outgoing power to determine if there is a fault condition and wherein said switching between receiving the power signal from the power supply unit and the DC back up power unit occurs on a periodic basis even when no fault condition exists in the power supply unit.

2. The apparatus of claim 1, wherein, the location of the DC back up power unit in the ND to minimize a physical dimensions of the DC back up power unit based on minimizing an energy conversion loss of the DC back up power unit compared to a second DC back up power unit located outside the NID.

3. The apparatus of claim 1, wherein the location of the DC back up power unit in the NID to minimize the size of the DC back up power unit based on minimizing a transmission loss of the power supplied to the NID from the DC back up power unit compared to a second DC back up power unit located outside the NID.

4. The apparatus of claim 1, wherein the location of the DC back up power unit in the NID to provide access to the DC back up power unit outside the building in order to install and maintain the DC back up power unit without having access to the building.

5. The apparatus of claim 1, wherein a first phone line having a first ring/tip pair that couples the power signal between the power supply unit and the NID.

6. The apparatus of claim 1, wherein a second phone line comprises one wire from a second ring/tip pair and a third phone line comprises one wire from a third ring/tip pair that couples the power signal between the power supply unit and the NID.

7. The apparatus of claim 1, wherein the power supply unit is configured to provide the power signal at a frequency with a range of 20 KHz to 50 KHz, which is above a voice frequency band and below a home phone line networking frequency band.

8. A system comprising:
a network interface device (NID) located outside a building, the NID having a communication gateway with a subscriber line interface circuit;
a power supply unit located inside the building, the power supply unit having one or more ports to provide power to the NID via a phone line; and
a DC back up power unit located in the NID, the DC back up power unit to provide back up power to the NID, wherein the NID is configured to periodically switch between receiving the power signal from the power supply unit and the DC back up power unit and when the power signal is received from the DC back up power unit, the apparatus enters a fault detection mode and, when in said mode, the power supply unit monitors its outgoing power to determine if there is a fault condition and wherein said switching between receiving the power signal from the power supply unit and the DC back up power unit occurs even when no fault condition exists in the power supply unit.

9. The system of claim 8, wherein the DC back up power unit comprises a battery unit.

10. The system of claim 8, wherein the DC back up power unit comprises a fuel cell unit.

11. The system of claim 8, wherein the communication gateway having a controller to control a switch that periodically determines whether the NID receives power from the power supply unit or the DC back up power unit.

12. The system of claim 8, wherein the location of the DC back up power unit in the NID to provide access to the DC back up power unit outside the building in order to configure the size of the DC back up power unit without having access to the building.

13. The system of claim 8, wherein the communication gateway having a controller to control a charging rate of the DC back up power unit.

14. The system of claim 8, wherein the communication gateway having a processing unit to control the charging efficiency of the DC back up power unit by monitoring at least one of voltage, current, and temperature of the DC back up power unit.

15. The system of claim 8, wherein the communication gateway to provide voice-over-internet-protocol (VOIP) telephone service with lifeline functionality even during a power outage based on the DC back up power unit supplying power to the communication gateway during the power outage.

16. A method comprising:
locating a communication gateway at a network interface device (NID) located outside a building;
supplying power to the NID with a power supply unit inside the building;
providing back up power to the NID with a DC back up power unit located in the NID;
periodically switching the supply power of the NID from the supply power received from the power supply unit to the back up power provided by the DC back up power unit and when the power signal is received from the DC back up power unit, entering the apparatus into a fault detection mode and, when in said mode, the power supply unit monitors its outgoing power to determine if there is a fault condition and wherein said switching between receiving the power signal from the power supply unit and the DC back up power unit occurs even when no fault condition exists in the power supply unit.

17. The method of claim 16, wherein the location of the DC back up power unit in the NID to minimize the size of the DC back up power unit based on minimizing an energy conversion loss of the DC back up power unit compared to a second DC back up power unit located outside the NID.

18. The method of claim 16, wherein the location of the DC back up power unit in the NID to minimize the size of the DC back up power unit based on minimizing a transmission loss of the power supplied to the NID from the DC back up power unit compared to a second DC back up power unit located outside the NID.

19. The method of claim 16, wherein the location of the DC back up power unit in the NID to provide access to the DC back up power unit outside the building in order to install and maintain the DC back up power unit without having access to the building.

* * * * *